(12) United States Patent  
Liang

(10) Patent No.: US 8,011,881 B1  
(45) Date of Patent: Sep. 6, 2011

(54) TURBINE VANE WITH SERPENTINE COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 871 days.

(21) Appl. No.: 12/017,225

(22) Filed: Jan. 21, 2008

(51) Int. Cl.  
*F01D 5/08* (2006.01)

(52) U.S. Cl. ..................... 415/115; 415/191; 415/211.2

(58) Field of Classification Search ............. 416/97 R, 416/96 R, 193 A; 415/115  
See application file for complete search history.

(56) References Cited

U.S. PATENT DOCUMENTS

| 5,320,485 | A | * | 6/1994 | Bourguignon et al. | ........ 415/115 |
| 5,954,475 | A | * | 9/1999 | Matsuura et al. | ............. 415/115 |
| 6,099,244 | A | * | 8/2000 | Tomita et al. | ................. 415/115 |
| 7,785,072 | B1 | * | 8/2010 | Liang | .......................... 416/97 R |

* cited by examiner

*Primary Examiner* — Ninh H Nguyen  
*Assistant Examiner* — Andrew Knopp  
(74) *Attorney, Agent, or Firm* — John Ryznic

(57) ABSTRACT

A stator vane for a gas turbine engine having a cooling circuit that passes through the airfoil and both of the inner and the outer diameter endwalls to provide cooling for the airfoil and endwalls. Each endwall includes an intricate cooling circuit and is connected to the serpentine flow circuit within the airfoil to pass cooling air back and fourth from one endwall to the other through one of the legs in the serpentine flow circuit of the airfoil. A row of exit cooling holes is located in one or both of the endwalls and is connected to the last leg of the serpentine circuit to discharge cooling air. The airfoil and endwalls cooling circuit forms a series of passages that meander through the vane before discharging out through the exit holes.

26 Claims, 8 Drawing Sheets

TURBINE VANE WITH SERPENTINE COOLING

BACKGROUND OF THE INVENTION

1. Field of the Invention

The present invention relates generally to a gas turbine engine, and more specifically to a turbine stator vane with a serpentine flow cooling circuit.

2. Description of the Related Art Including Information Disclosed Under 37 CFR 1.97 and 1.98

In a gas turbine engine, a high temperature gas flow is created in a combustor and then passed through a turbine, typically having a plurality of stages of vanes and blades, in order to convert the energy from the heated gas into mechanical work by driving the rotor shaft. In an aero engine used to power an aircraft, the rotor shaft is used to drive the fan and provide propulsion for the aircraft. In an industrial gas turbine (IGT) engine, the rotor shaft drives an external electric generator to produce electric power. In either engine, the efficiency can be increased by passing a higher temperature gas into the turbine. Since the first stage airfoils (the vanes and blades) are exposed to the hottest temperature gas, these airfoils are critical in determining the turbine inlet temperature, or TIT.

The highest temperature in which the first stage airfoils can operate is dependent upon the material properties and the amount of cooling provided by the compressed cooling air from the compressor. Without any change in the materials used, these airfoils can be exposed to higher temperatures by improving the cooling capability. Therefore, higher gas temperatures can be used if the cooling capability of these airfoils is increased.

FIGS. 1 and 2 show one prior art turbine vane with a serpentine flow cooling circuit. U.S. Pat. No. 5,488,825 issued to Davis et al on Feb. 6, 1996 and entitled GAS TURBINE VANE WITH ENHANCED COOLING discloses a turbine vane with a serpentine flow cooling circuit having a 5-pass aft flowing serpentine for the vane airfoil section, also, individual ID and OD endwalls cooling circuit, two ID and OD turns, skew trip strips for all serpentine cooling passages, cooling air feed through the airfoil leading edge passage from OD endwall, trailing edge discharge cooling slots, and a jumper tube for the delivery of cooling air to seal the housing for ID endwall cooling and purge air.

BRIEF SUMMARY OF THE INVENTION

An improvement for the entire airfoil cooling system of the above prior art cooling circuit can be achieved by the integration of both endwalls cooling into the 5-pass serpentine flow cooling circuit in which the total cooling air can be fully utilized in the cooling of the vane.

Cooling air is channeled into the vane airfoil mid-chord section first to provide cooling for the vane airfoil mid section. This cooling air then flows forward and makes a root turn within the ID endwall structure to provide cooling for the airfoil ID endwall. The cooling air then flows outward toward the OD endwall. Once again, the cooling air makes the tip turn within the OD endwall to provide cooling for the endwall. This cooling air is then channeled through the airfoil leading edge flow channel to provide cooling for the vane leading edge. The spent cooling air then makes a root turn within the ID endwall toward the trailing edge and is channeled into the fourth leg of the 5-pass serpentine flow circuit. The spent cooling air from the four leg serpentine flow channel then makes the tip turn within the OD endwall trailing edge region. A portion of the cooling can be bled off from the serpentine flow channel to provide OD endwall trailing edge rail cooling. The rest of the cooling air is then channeled through the fifth leg of the serpentine flow circuit. Cooling air is bled off from the fifth leg of the serpentine flow circuit periodically for cooling of the airfoil trailing edge. A portion of the cooling air exiting the fifth serpentine flow channel provides cooling for the ID endwall trailing edge.

DETAILED DESCRIPTION OF THE INVENTION

Figure 1:
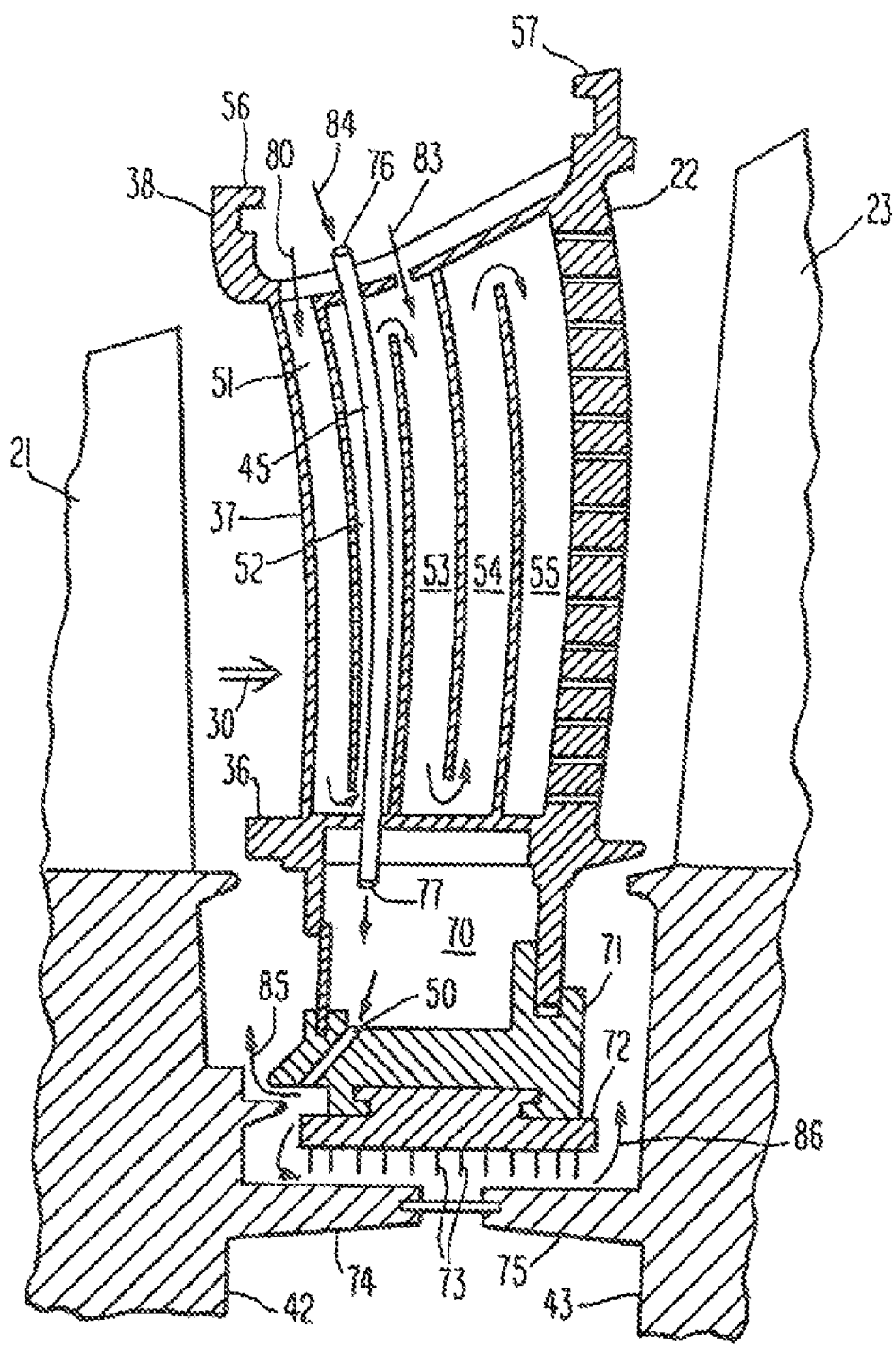
FIG. 1 shows a cross section side view of a serpentine flow cooling circuit of the prior art.
Figure 2:
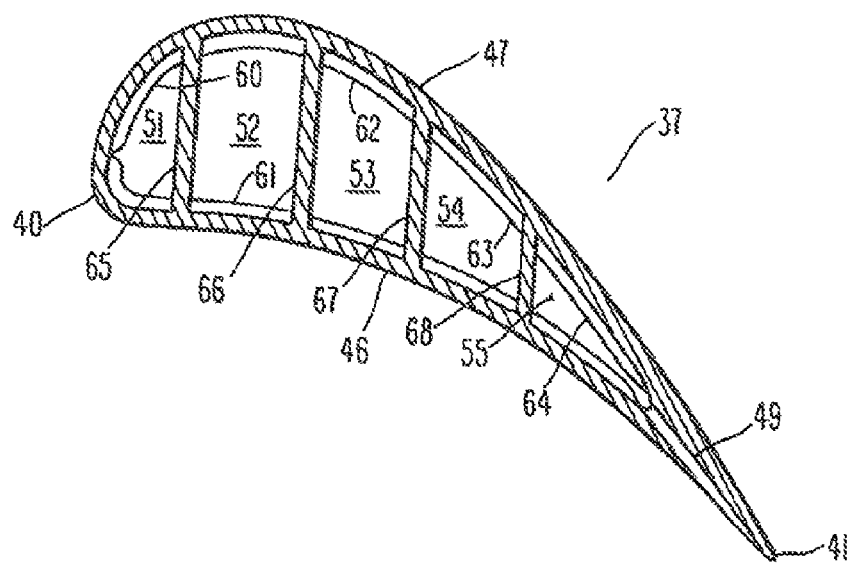
FIG. 2 shows a top cross section view of the serpentine flow cooling circuit of the prior art vane of FIG. 1.
Figure 3:
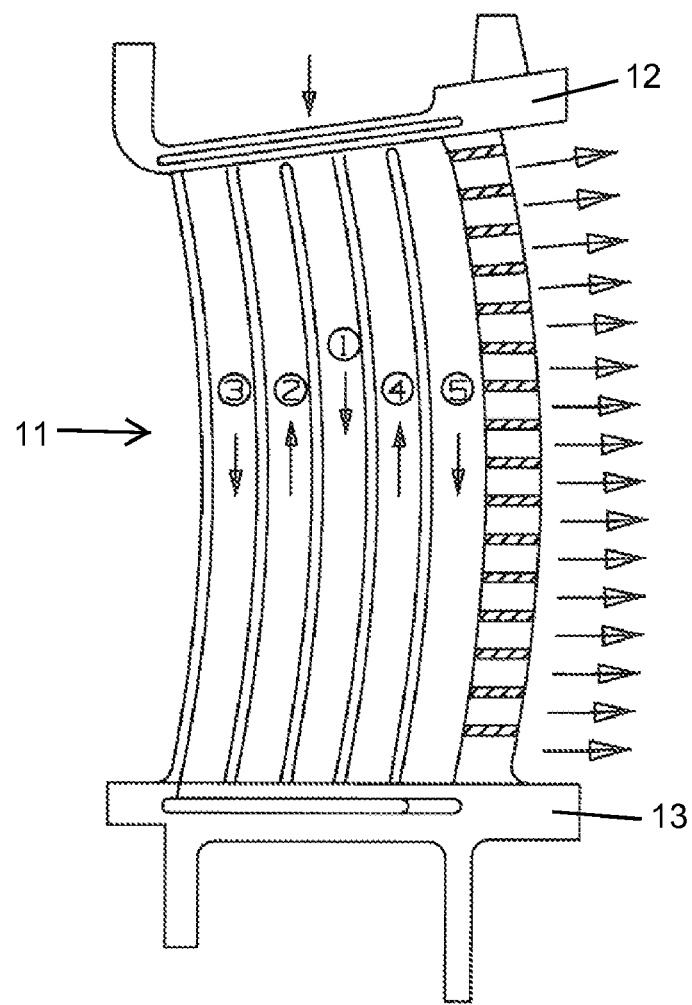
FIG. 3 shows a cross section side view of the serpentine flow cooling circuit of the present invention.
Figure 4:
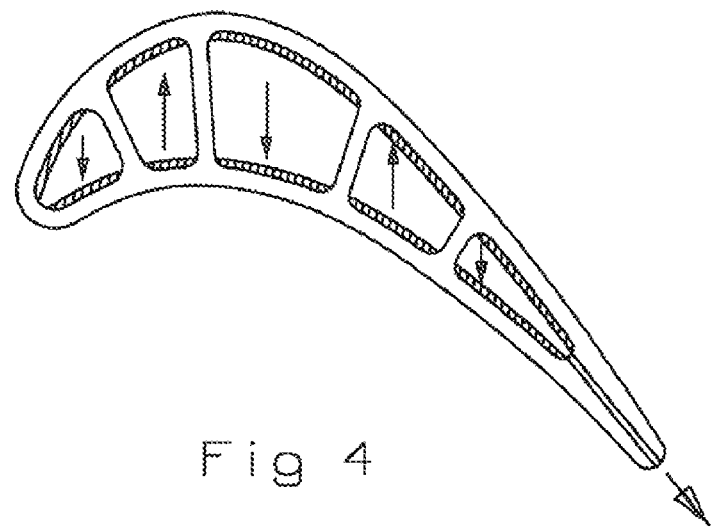
FIG. 4 shows a cross section top view of the cooling circuit of the present invention of FIG. 3.

The present invention is a cooling circuit for a stator vane of a gas turbine engine in which the stator vane includes inner diameter (ID) and outer diameter (OD) endwalls that also require cooling. FIG. 3 shows a cross section of the side view of the stator vane and internal cooling circuit of the present invention. The vane includes an airfoil portion 11 extending between the OD endwall 12 and the ID endwall 13, the airfoil portion of the vane includes a 5-pass serpentine flow cooling circuit formed within the airfoil according to any of the well known processes such as investment casting. The 5-pass serpentine cooling circuit includes a first leg in the center of the airfoil, a second leg forward of the first leg, a third leg forward of the second leg and adjacent to the leading edge of the airfoil, a fourth leg aft of the first leg, and the fifth and last leg aft of the fourth leg and adjacent to the trailing edge region of the airfoil. The first, third and fifth legs all flow from the OD to the ID, and the second and fourth legs both flow in the opposite direction and from ID to OD. The 5-pass serpentine flow circuit is connected in series such that the cooling air flows into the first leg, then follows along the serpentine into the second leg, the third leg, the fourth leg and then the fifth leg. FIG. 4 shows a top view of a cross section with this serpentine flow path.

Figure 5:
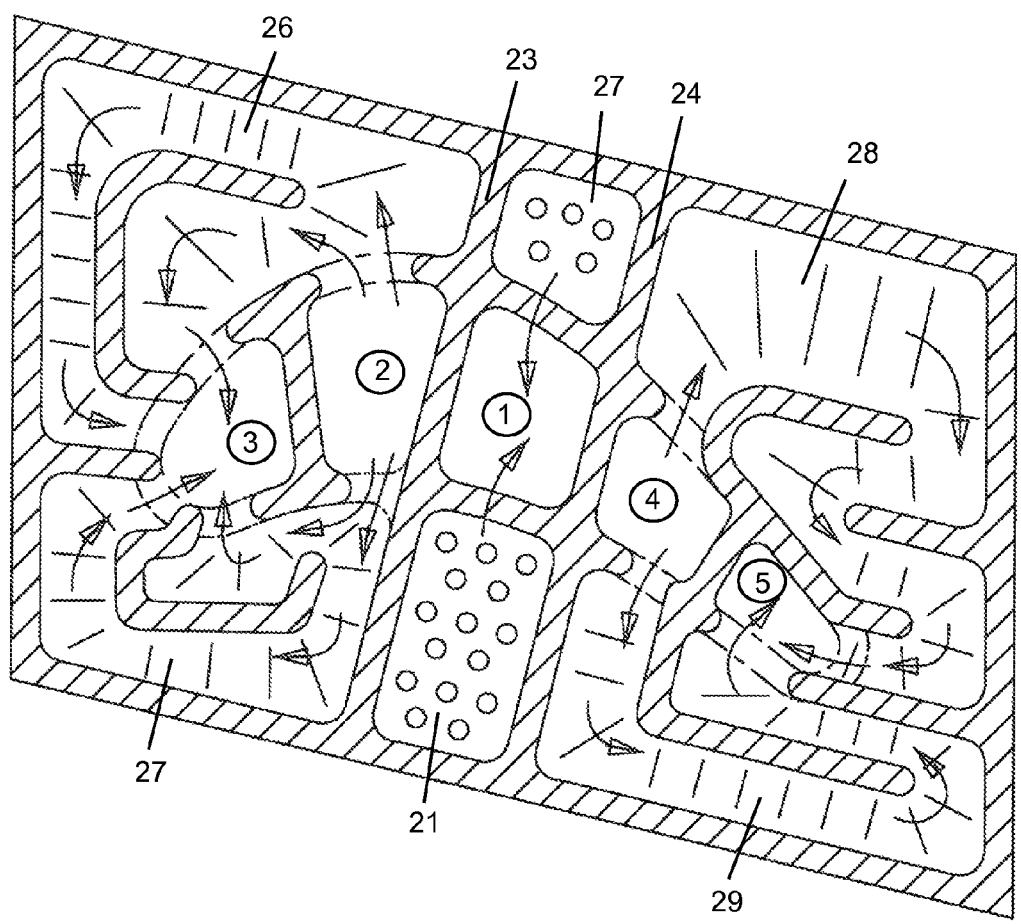
FIG. 5 shows a cross section top view of the OD endwall cooling circuit of the present invention.

FIG. 5 shows a cross section view of the OD endwall cooling circuit that provides the cooling for the endwall, the airfoil outline with the leading and trailing edges and the pressure side and suction side walls is clearly shown in FIG. 5 and the 5-pass serpentine flow cooling circuit with the 5 legs indicated in this figure with the leg number circled. Adjacent to the first leg are two impingement zones 21 and 22 for the cooling air supply, with one impingement zone 21 located on the pressure side of the first leg and the second impingement zone 22 located on the suction side of the first leg. A forward rib 23 runs across the endwall and separates the first leg and the two impingement zones 21 and 22 from the leading edge side of the OD endwall cooling circuit. An aft rib 24 runs across the endwall and separates the first leg and the two impingement zones 21 and 22 from the trailing edge side of the OD endwall cooling circuit. Pin fins are located in the impingement zones 21 and 22 to enhance the heat transfer coefficient within these zones.

Cooling air spent from the second leg of the 5-pass serpentine cooling circuit flows into the leading edge OD endwall cooling circuit as seen in FIG. 5. A suction side OD endwall circuit 26 is located on the suction side half and a pressure side OD endwall circuit 27 is located on the pressure side of the leading edge OD endwall cooling circuit. Each of these two circuits includes 2 parallel passages that each discharge into the third leg of the serpentine flow circuit. The parallel paths are separated by curved ribs as seen in FIG. 5. All of the passages within the endwall circuit include skew trip strips to enhance the heat transfer coefficient.

Cooling air spent from the fourth leg of the 5-pass serpentine cooling circuit flows into the trailing edge OD endwall cooling circuit as seen in FIG. 5. A suction side OD endwall circuit 28 is located on the suction side half and a pressure side OD endwall circuit 29 is located on the pressure side of the leading edge OD endwall cooling circuit. Each of these two circuits 28 and 29 discharge into the fifth leg of the serpentine flow circuit. All of the passages within the endwall circuit include skew trip strips to enhance the heat transfer coefficient.

Figure 6:
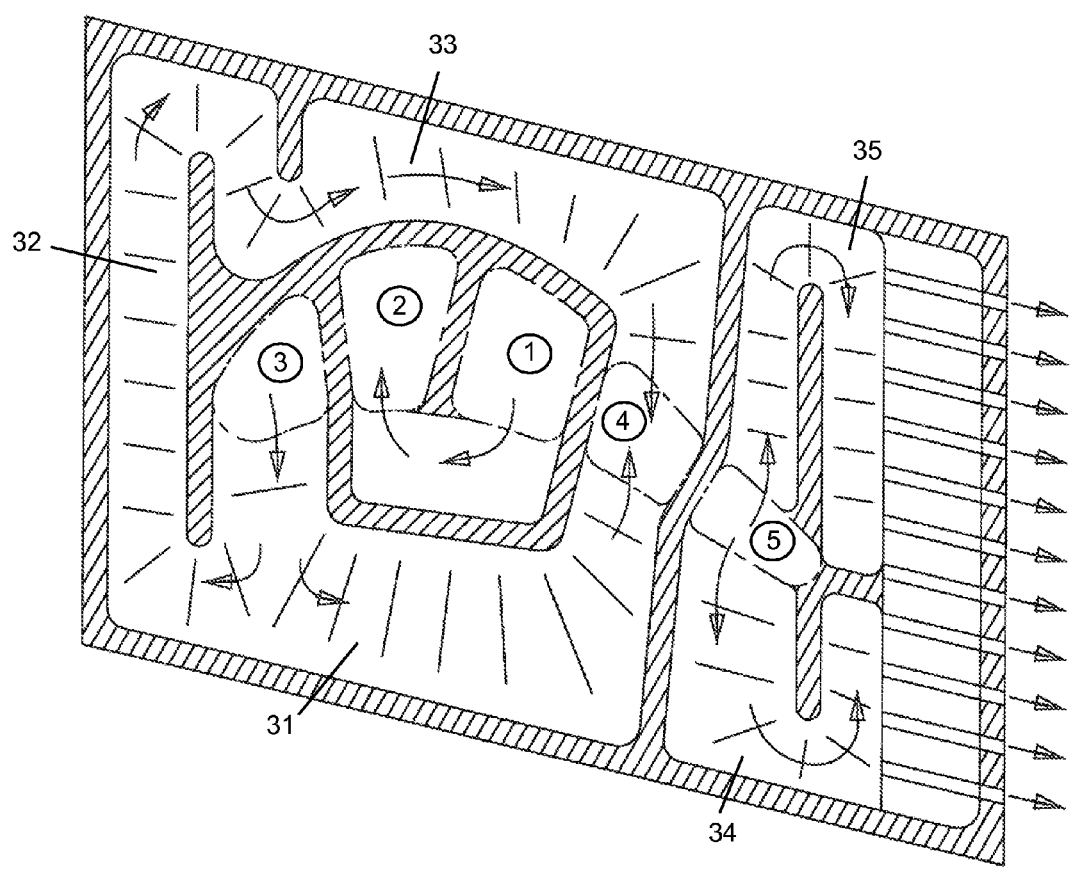
FIG. 6 shows a cross section top view of the ID endwall cooling circuit of the present invention.

FIG. 6 shows the ID endwall cooling circuit with the 5-pass serpentine cooling circuit and the five legs represented in the figure. Cooling air from the first leg flows into the second leg and is directed by a continuous ribs that curved around the first and second legs as seen in FIG. 6. Cooling air discharging from the third leg flows into a common passage formed within the ID endwall and then splits up into pressure side endwall passage 31 or a leading edge side endwall passage 32. The cooling air from the leading edge endwall side endwall passage 32 then flows through a suction side endwall passage 33 and then into the fourth leg of the 5-pass serpentine flow circuit. Three ribs extend out from the side walls and into the cooling passages to provide a small serpentine flow circuit to enhance the cooling effect and increase the cooling passage length. The cooling air from the two endwall passages 31 and 33 both discharge into the same fourth leg of the 5-pass serpentine flow circuit.

Cooling air from the fifth leg of the 5-pass serpentine flow circuit splits into two endwall trailing edge side passages 34 and 35 that both wind around to form a 180 degree turn for the cooling air and then flows along a passage extending along the trailing edge side of the endwall in which a row of exit cooling holes are arranged to discharge the cooling air out from the ID end wall cooling circuit. Skewed trip strips are also located along the passages within the ID endwall to enhance the heat transfer coefficient and therefore the cooling effectiveness.

The cooling air flow in the first embodiment described in FIGS. 3 through 6 is as follows. Pressurized cooling air from an external source is delivered to the two impingement zones 21 and 22 in the OD endwall and flow between the pin fins and then into the first leg of the 5-pass serpentine flow circuit. The cooling air then flows downward in the first leg toward the ID endwall, through the connecting passage in the ID endwall and into the second leg of the 5-pass serpentine circuit, flows up the second leg and then discharges into the OD endwall by splitting up into either the pressure side OD endwall circuit 26 or the suction side OD endwall circuit 27 to provide cooling to the OD endwall leading edge side, and then discharges into the third leg.

This cooling air then flows down the third leg to provide leading edge cooling for the airfoil, and then flows into the ID endwall circuit by splitting up into pressure side endwall passage 31 or a leading edge side endwall passage 32 to provide cooling for most of the ID endwall. The cooling air from channel 32 flows into the channel 33 and then into the fourth leg, as does the cooling air from the channel 31 on the pressure side of the endwall, the cooling air entering the fourth leg then flows up the airfoil and into the OD endwall where the cooling air splits up into the pressure side OD endwall circuit 28 or the suction side OD endwall circuit 29 in which both passages 28 and 29 wind around the trailing edge side of the OD endwall before discharging into the fifth leg.

From the fifth leg, the cooling air flows downward toward the ID and along the trailing edge region of the airfoil and into the ID endwall, where the cooling flow splits up into the two endwall trailing edge side passages 34 and 35 and then out through the exit cooling holes to be discharge out from the endwall. Thus, the cooling air flows through a continuous passage through the legs of the serpentine within the airfoil and through the two endwalls, sometimes in parallel passages, before finally discharging out through a row of exit cooling holes positioned along the trailing edge side of the ID endwall.

Figure 7:
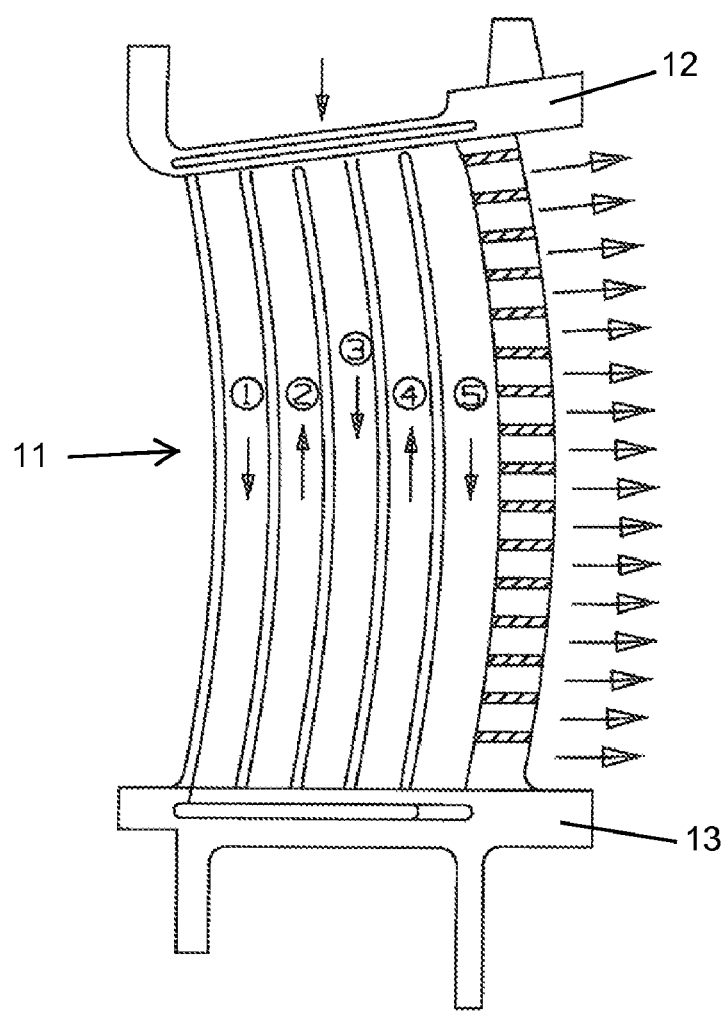
FIG. 7 shows side cross section view of a second embodiment of the cooling circuit of the present invention.
Figure 8:
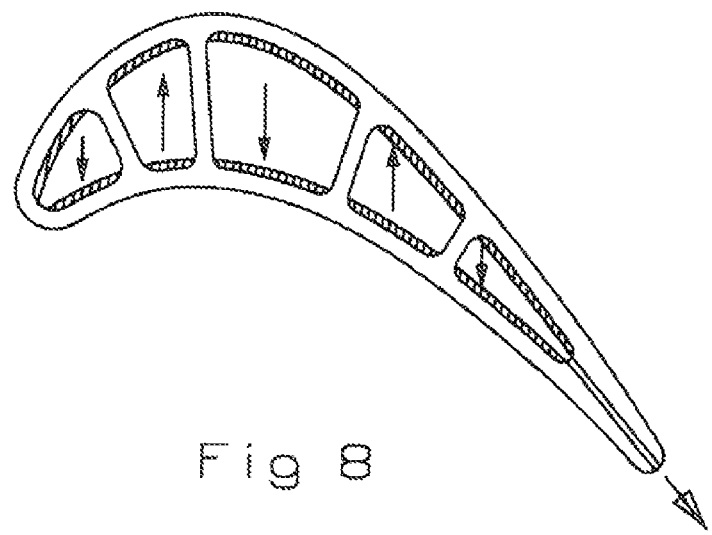
FIG. 8 shows a top cross section view of the cooling circuit in the second embodiment of FIG. 7.

A second embodiment of the present invention is shown in FIGS. 7 through 10 for a stator vane with an aft flowing serpentine cooling circuit. FIG. 7 shows the vane with the OD and ID endwalls and the airfoil section 11 with the five legs that form the aft flowing serpentine circuit represented by the leg # in the circles. The first leg is located along the leading edge of the airfoil while the fifth and last leg is located along the trailing edge region of the airfoil. FIG. 8 shows a top cross section view of the 5-pass aft flowing serpentine cooling circuit of the FIG. 7 second embodiment.

Figure 9:
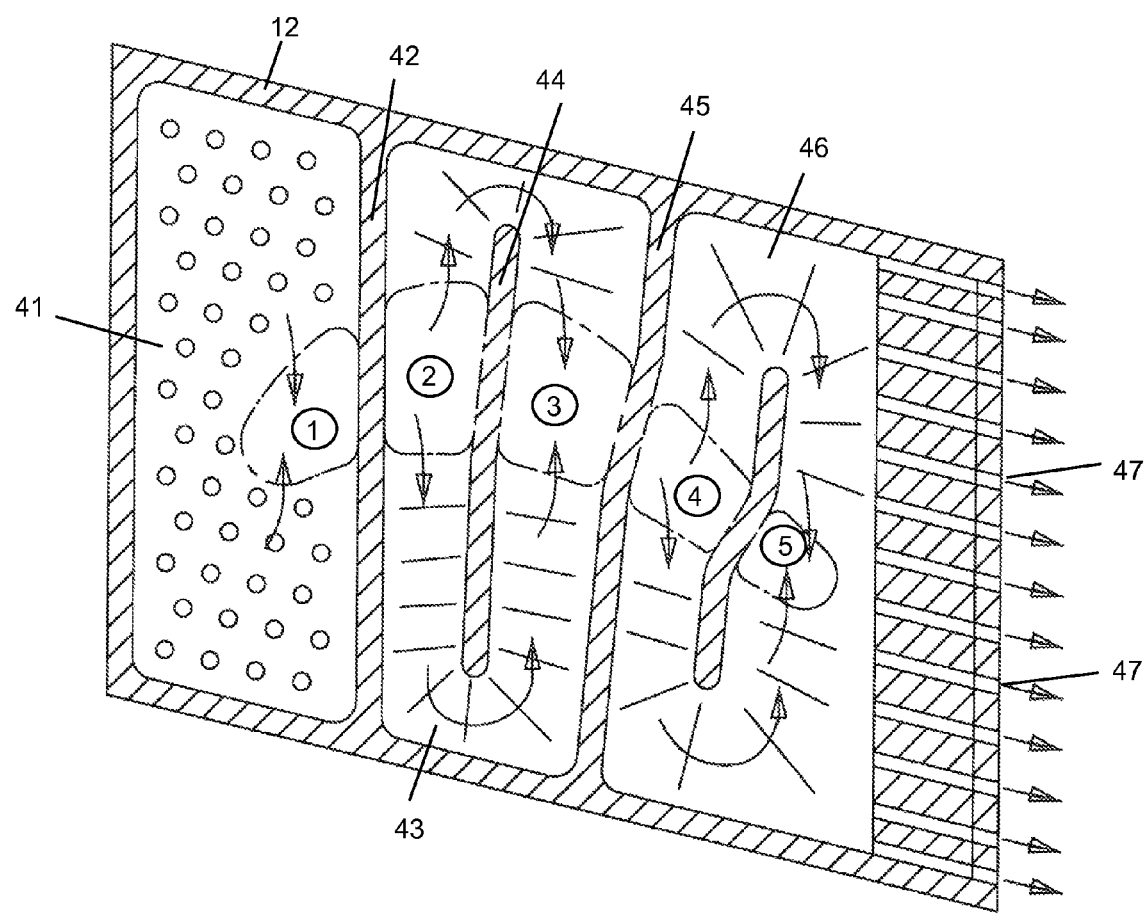
FIG. 9 shows a cross section top view of the OD endwall cooling circuit of the second embodiment of the present invention.

FIG. 9 shows a cross section view of the OD endwall cooling circuit of the second embodiment with the airfoil outline and the five legs of the 5-pass serpentine circuit shown. A leading edge side impingement section 41 extends across the endwall and includes pin fins to enhance the heat transfer coefficient. Cooling air from the supply flows into this impingement section 41, around the pin fins and then into the inlet of the first leg of the 5-pass serpentine circuit. A first OD rib 42 separates the impingement section 41 from a mid-section OD endwall passage 43 in which the second leg and the third leg of the 5-pass serpentine opens into. A second OD rib 45 separates the mid-section OD endwall passage 43 from a trailing edge OD endwall passage 46 in which the fourth leg and the fifth leg of the 5-pass serpentine opens into. A row of exit cooling holes discharge the cooling air from the passage directly connected to the fifth leg out from the OD endwall cooling circuit.

Figure 10:
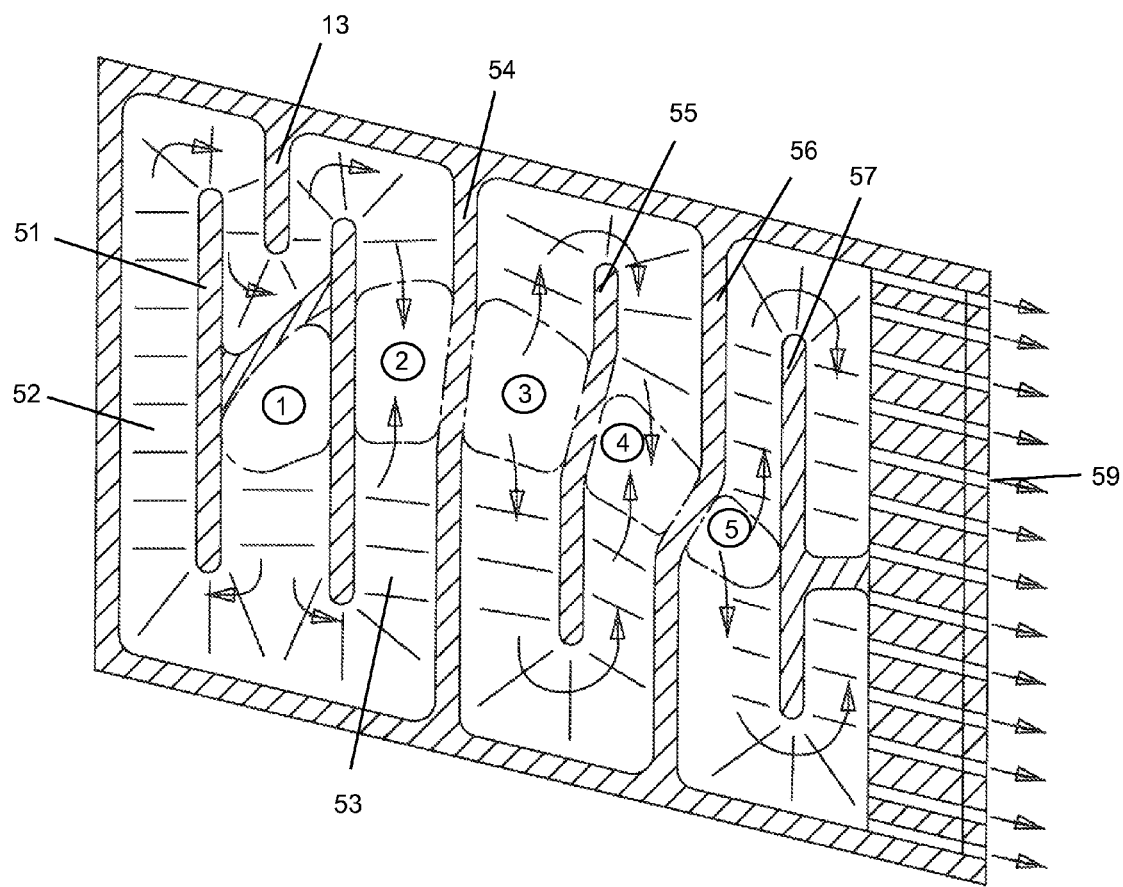
FIG. 10 shows a cross section top view of the ID endwall cooling circuit of the second embodiment of the present invention.

The ID endwall cooling circuit is shown in FIG. 10 with the airfoil and 5-pass serpentine circuit outline shown in the figure. An H-shaped rib 51 forms a serpentine flow passage within the endwall and separates the first leg from the second leg such that cooling flow from the first leg will wind around this portion of the endwall circuit and flow into the second leg. Cooling air exits the first leg and flows into endwall passage 52 or passage 53 before merging again and into the second leg. A first ID rib 54 separates the second leg from the third leg, and a second ID rib separates the fourth leg from the fifth leg. A second ID rib 55 forms a parallel passage from the third leg to the fourth leg so that the cooling air flows around the ID endwall circuit. A third ID rib 56 separates the fourth leg from the fifth leg. A fourth ID rib 57 separates the cooling passage from the fifth leg into two separate passages around the ID endwall trailing edge section before discharging the cooling air out from a row of exit cooling holes spaced along that edge of the ID endwall. Trip strips are located along the various passages in the OD and ID endwall cooling circuit to promote heat transfer coefficient.

The cooling flow path for the second embodiment is described here. Pressurized cooling air from an external source is delivered to the OD impingement section 41 and flows around the pin fins before passing into the first leg of the 5-pass serpentine, down the first leg to provide cooling for the airfoil leading edge, and then flows into the passages 52 and 53 in the ID endwall circuit, into the second leg and up to the OD endwall circuit, around the passage 43 and into the third leg, down the airfoil through the third leg and into the passages in the ID endwall circuit between the ribs 54 and 56, into the fourth leg and up through the airfoil, into the OD passage 46 and around the rib, and then into the fifth leg and down through the airfoil, and then into the passage within the ID endwall and around the rib 57, and then out through the exit cooling holes 59.

Major design features and advantages of the cooling circuit of the present invention over the prior art 5-pass aft flowing serpentine design are described below. The current serpentine cooling flow circuit utilizes the endwall cooling for the airfoil. The serpentine root turn and tip turn are build in within the endwall and thus provide for the cooling for the endwall and eliminates the use of turn manifolds. A single cooling flow entrance for the serpentine flow circuit provides for a robust cooling flow control capability for the integrated aft flowing serpentine circuit of the present invention. Cooling the mid-channel first will yield a higher creep life capability for the vane. An alternative cooling circuit of the second embodiment for a prior art aft flowing 5-pass serpentine cooling circuit with the use of the integrated cooling circuit of the present invention with maximize the oxidation life for a higher gas temperature application.

I claim the following:

1. A turbine vane comprising:
   An outer diameter endwall and an inner diameter endwall;
   An airfoil extending between the outer diameter endwall and the inner diameter endwall;
   An outer diameter endwall cooling circuit formed within the outer diameter endwall;
   An inner diameter endwall cooling circuit formed within the inner diameter endwall;
   A multiple pass serpentine flow cooling circuit formed within the airfoil;
   A cooling air supply channel formed within the outer diameter endwall cooling circuit and connected to the first leg of the multiple pass serpentine circuit;
   A first to second cooling passage formed in the ID endwall cooling circuit to connect the first leg to the second leg;
   A second to third cooling passage formed in the OD endwall cooling circuit to connect the second leg to the third leg;
   A third to fourth cooling passage formed in the ID endwall cooling circuit to connect the third leg to the fourth leg;
   A fourth to fifth cooling passage formed in the OD endwall cooling circuit to connect the fourth leg to the fifth leg; and,
   A row of exit cooling holes connected to the fifth leg to discharge cooling air from the ID endwall cooling circuit.

2. The turbine vane of claim 1 and further comprising:
   The cooling passages formed within the airfoil and the two endwalls form a series path for the cooling air between the cooling air supply channel formed within the outer diameter endwall and the row of exit cooling holes formed in the ID endwall cooling circuit.

3. The turbine vane of claim 1 and further comprising:
   The first leg of the serpentine circuit is located in the airfoil mid-chord region.

4. The turbine vane of claim 1 and further comprising:
   The first leg of the serpentine circuit is located in the airfoil leading edge region such that the serpentine circuit forms an aft flowing serpentine flowing circuit within the airfoil.

5. The turbine vane of claim 3 and further comprising:
   The second to third cooling passage formed in the outer diameter endwall cooling circuit includes four parallel passages between the second and third legs that cover substantially the entire outer diameter endwall in the leading edge region of the endwall.

6. The turbine vane of claim 3 and further comprising:
   The third to fourth cooling passage formed in the inner diameter endwall cooling circuit includes two parallel passages between the third and fourth legs that cover substantially the leading edge region and the mid-chord region of the inner diameter endwall cooling circuit.

7. The turbine vane of claim 3 and further comprising:
   The fourth to fifth cooling passage formed in the outer diameter endwall cooling circuit includes two parallel passages between the fourth and fifth legs that cover substantially the trailing edge region of the outer diameter endwall cooling circuit.

8. The turbine vane of claim 3 and further comprising:
   The row of exit cooling holes connected to the fifth leg are connected through two separate cooling passages to form a first row of exit cooling holes separated from a second row of exit cooling passages.

9. The turbine vane of claim 4 and further comprising:
   The first to second cooling passage formed in the ID endwall cooling circuit includes two parallel passages that extend around the leading edge side of the inner diameter endwall.

10. The turbine vane of claim 4 and further comprising:
    The second to third cooling passage formed in the OD endwall cooling circuit includes two parallel passages formed by a separation rib.

11. The turbine vane of claim 4 and further comprising:
    The third to fourth cooling passage formed in the ID endwall cooling circuit includes two parallel passages formed by a separation rib.

12. The turbine vane of claim 4 and further comprising:
    The fourth to fifth cooling passage formed in the OD endwall cooling circuit includes two parallel passages formed by a separation rib.

13. The turbine vane of claim 4 and further comprising:
    The row of exit cooling holes connected to the fifth leg are connected through two separate cooling passages to form a first row of exit cooling holes separated from a second row of exit cooling passages.

14. The turbine vane of claim 4 and further comprising:
    The outer diameter endwall and the inner diameter endwall both include a row of exit cooling holes connected to the cooling circuit to discharge cooling air.

15. A process for cooling a stator vane of a gas turbine engine, comprising the steps of:
    Supplying cooling air to an impingement chamber in the outer diameter endwall;

Passing the cooling air from the impingement chamber through a first leg of a serpentine cooling circuit formed within the airfoil;

Passing the cooling air from the first leg through the inner diameter endwall to cool a portion of the inner diameter endwall and then into the second leg of the serpentine circuit;

Passing the cooling air from the second leg through a portion of the outer diameter endwall to provide cooling for the portion;

Passing the cooling air from the outer diameter endwall through a third leg of the serpentine circuit; and, Passing the cooling air from the third leg through a portion of the inner diameter endwall to provide cooling to this portion.

16. The process for cooling a stator vane of claim 15, and further comprising the step of:

Passing the cooling air through the first leg in the mid-chord region of the airfoil.

17. The process for cooling a stator vane of claim 15, and further comprising the step of:

Passing the cooling air through the first leg in the leading edge region of the airfoil.

18. The process for cooling a stator vane of claim 15, and further comprising the step of:

Discharging the cooling air through a row of exit holes in the inner diameter endwall.

19. A turbine vane comprising:

An outer diameter endwall and an inner diameter endwall;

An airfoil extending between the outer diameter endwall and the inner diameter endwall;

An outer diameter endwall cooling circuit formed within the outer diameter endwall;

An inner diameter endwall cooling circuit formed within the inner diameter endwall; and, A multiple pass serpentine flow cooling circuit formed within the airfoil; and, Cooling air passage means to connect the two ends wall cooling circuit and the airfoil serpentine flow cooling circuit so that cooling air flows from a first passage in the outer endwall cooling circuit, through a first channel in the airfoil serpentine flow cooling circuit, into a first passage in the inner diameter endwall cooling circuit, through a second channel in the airfoil serpentine flow cooling circuit, and then into a second passage in the outer endwall cooling circuit to provide cooling for the endwalls and the airfoil.

20. The turbine vane of claim 19 and further comprising:

The endwall passages are serpentine flow passages each having at least one turn of greater than 90 degrees.

21. The turbine vane of claim 20 and further comprising:

The airfoil includes a 5-pass serpentine flow cooling circuit.

22. The turbine vane of claim 21 and further comprising:

The first leg of the 5-pass serpentine flow cooling circuit is located forward of the remaining four legs.

23. The turbine vane of claim 21 and further comprising:

The first leg of the 5-pass serpentine flow cooling circuit is located in the middle of the remaining four legs.

24. The turbine vane of claim 21 and further comprising:

A row of trailing edge exit holes connected to the last leg of the 5-pass serpentine flow cooling circuit.

25. The turbine vane of claim 19 and further comprising:

At least one of the outer diameter endwall and the inner diameter endwall includes a row of exit cooling holes on the downstream end to discharge cooling air from the respective endwall passage.

26. The turbine vane of claim 19 and further comprising:

Trip strips located within the inner and the outer endwall cooling circuits to enhance the heat transfer coefficient.

\* \* \* \* \*